United States Patent [19]
Keery et al.

[11] Patent Number: 6,008,857
[45] Date of Patent: Dec. 28, 1999

[54] METHODS OF AND APPARATUS FOR ENCODING AND DECODING DIGITAL DATA FOR REPRESENTATION IN A VIDEO FRAME

[75] Inventors: Peter A. Keery, Brewster; Susumu Murakami, Monsey, both of N.Y.

[73] Assignees: Sony Corporation, Tokyo, Japan; Sony Electronics, Inc., Park Ridge, N.J.

[21] Appl. No.: 08/905,779

[22] Filed: Jul. 29, 1997

Related U.S. Application Data

[62] Division of application No. 08/425,075, Apr. 19, 1995, Pat. No. 5,719,634.

[51] Int. Cl.[6] .................................................. H04N 7/00
[52] U.S. Cl. .................. 348/469; 348/384; 348/390; 348/463; 348/845; 382/232; 382/235; 382/238
[58] Field of Search .................................. 348/385, 386, 348/387, 469, 471, 472, 463, 465, 473, 467, 571, 575, 384, 390, 845; 364/514 A; 382/232, 235, 236, 238, 239; 386/109, 111, 112; H04N 7/00, 11/00

[56] References Cited

U.S. PATENT DOCUMENTS

| | | | |
|---|---|---|---|
| 4,032,972 | 6/1977 | Saylor | 348/463 |
| 4,636,858 | 1/1987 | Hague | 348/463 |
| 4,916,539 | 4/1990 | Galumbeck | 348/461 |
| 5,091,936 | 2/1992 | Katznelson | 348/462 |
| 5,347,315 | 9/1994 | Mary | 348/463 |
| 5,541,662 | 7/1996 | Adams | 348/461 |
| 5,719,634 | 2/1998 | Keery | 348/463 |
| 5,802,213 | 9/1998 | Garlos | 348/405 |
| 5,812,788 | 9/1998 | Argawal | 348/405 |

*Primary Examiner*—John K. Peng
*Assistant Examiner*—Wesner Sajous
*Attorney, Agent, or Firm*—Frommer Lawrence & Haug, LLP.; William S. Frommer

[57] ABSTRACT

Digital data comprised of bytes formed of a predetermined number of data bits are encoded for representation in a video frame. Each byte of digital data, or a portion thereof, is represented in a respective region of the video frame by one or more video component levels that are assigned to the region and which correspond to the numerical value of the data bits of the byte or of the portion. The digital data are represented in the video frames in place of a video image or, alternatively, are represented in the same frames in which video images are recorded but in the areas of the frame in which the video image is not ordinarily recorded. Digital data represented in the video frame are decoded from the video component levels assigned to the regions.

52 Claims, 19 Drawing Sheets

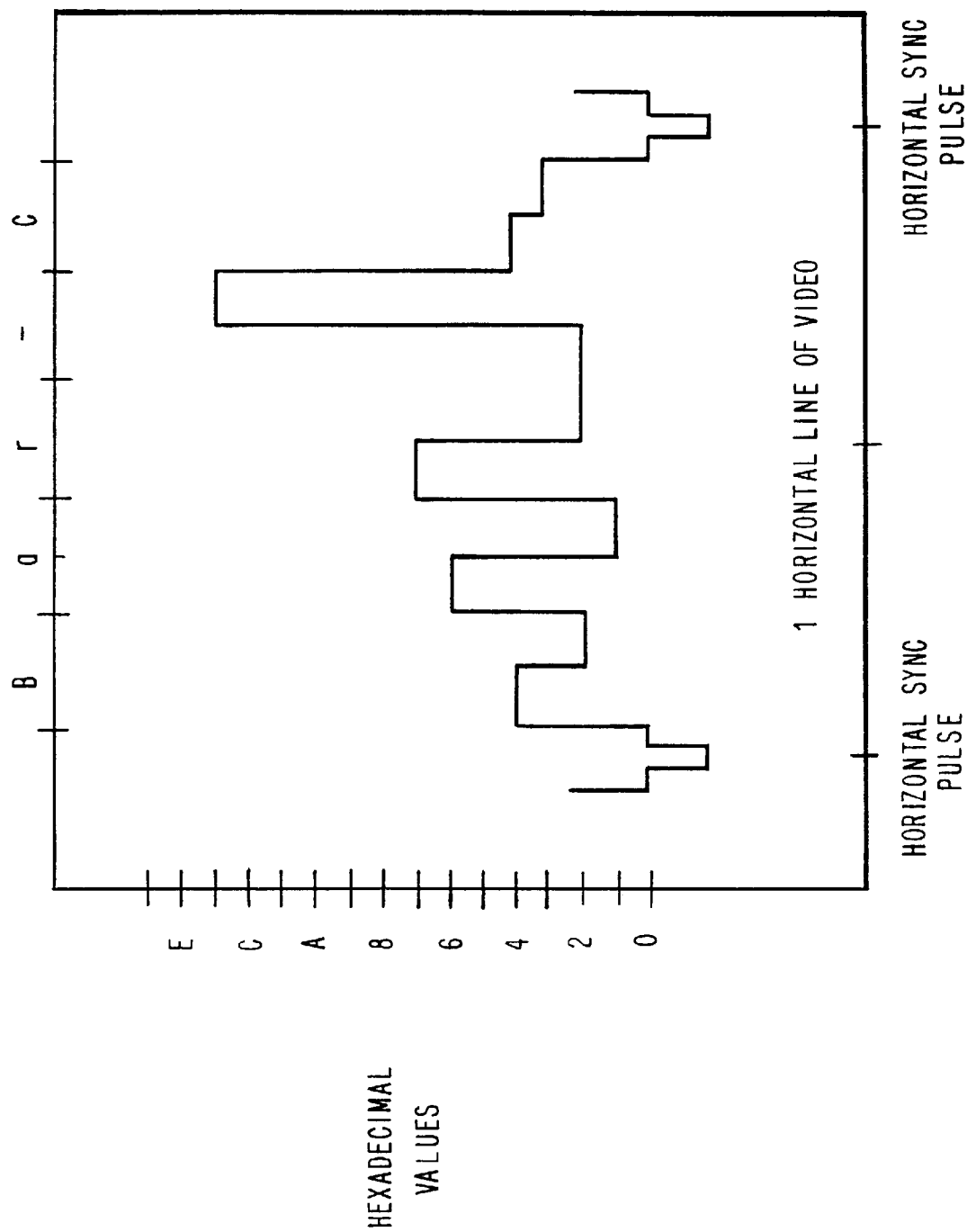

METHODS OF AND APPARATUS FOR ENCODING AND DECODING DIGITAL DATA FOR REPRESENTATION IN A VIDEO FRAME

This application is a division of application Ser. No. 08/425,075, filed Apr. 19, 1995, now U.S. Pat. No. 5,719,634.

BACKGROUND OF THE INVENTION

The present invention relates to methods of and apparatus for encoding and decoding digital data for transmission, recording or reproduction and, more particularly, to encoding and decoding digital data for representation in a video frame.

In video recording applications, it is frequently desirable to record digital data onto the same recording medium on which video image data are recorded. As an example, in the recording of video images acquired during a medical diagnostic procedure, text data identifying the patient tested and the time and date that the procedure was performed are often recorded with the video images.

The data may be stored in the video frames that precede the frames in which the video images are stored. As an example, text data associated with a medical diagnostic procedure, such as during an angiography, are recorded up until the time that the irradiation source reaches full power, after which the images generated during the diagnostic procedure are subsequently recorded. The text data may be recorded by the steps of arranging text characters on a letter board, irradiating the letter board, receiving the image of the letter board and then recording the image in plural video frames on a recording medium.

This conventional recording method has the drawback that only a small number of text characters can be arranged on a letter board for storage in the video frames and has the further drawback that the same text characters are stored in each of the frames.

Alternatively, the data may be stored in the same video frames in which the video images are stored such as by overlaying a portion of the video image with text characters, thereby obscuring a portion of the video image. If a large number of text characters is stored in the frame, a significant portion of the video image is obscured, and, as in the example in which medical diagnostic images are recorded, the obscured area may be a potentially critical region of the video image. As a result, only a limited amount of text data may be stored in the video frame without concealing the video image.

To store greater quantities of data in conjunction with the video images, the additional data may be recorded on a separate storage medium, such as in a computer file or database. However, when the video images are displayed, the additional data must be accessed separately and cannot be easily displayed with the video images.

OBJECTS OF THE INVENTION

Therefore, an object of the present invention is to provide methods of and apparatus for encoding and decoding digital data which avoid the aforementioned disadvantages.

Another object of the present invention is to provide methods of and apparatus for encoding and decoding digital data represented in a video frame so that greater quantities of digital data are stored in the video frame.

A further object of the present invention is to provide methods of and apparatus for encoding and decoding digital data represented in a video frame in which video image data are also recorded without obscuring portions of the video image data.

A still further object of the present invention is to provide methods of and apparatus for encoding and decoding digital data represented in a video frame in which video image data are recorded such that the data can easily be displayed concurrent with display of the video image data.

Various other objects, advantages and features of the present invention will become readily apparent from the ensuing detailed description, and the novel features will be particularly pointed out in the appended claims.

SUMMARY OF THE INVENTION

In accordance with an aspect of this invention, digital data comprised of bytes having a predetermined number of data bits are encoded for representation in a video frame. Respective numerical values are assigned to each one of selected video component levels. Bytes of digital data are divided into subsets of data bits, each of which has a numerical determined by the data bits, and the subsets are associated with the video component level that corresponds to the numerical value of the subset. Each of the subsets is allocated a region of the video frame, and the video component level associated with this subset is assigned to the region to generate an encoded video frame.

As another aspect of the present invention, numerical values are respectively assigned to selected first and second video component levels. The bytes of digital data are divided into pairs of subsets, and the subsets of each pair are respectively associated with the first and second video component levels having numerical values that correspond to the numerical values of the subsets. The associated first and second video component levels are assigned to a region of the video frame allocated to the pair of subsets.

As a further aspect of the present invention, respective bytes of digital data are associated with the video component levels that correspond to the numerical value determined by the data bits of the byte, and the associated video component level is assigned to a region of the video frame that is allocated to the respective byte.

In accordance with still another aspect of the present invention, pairs of bytes are respectively associated with first and second video component levels that correspond to the numerical values of the data bits of the bytes, and the first and second video component levels are assigned to the region of the video frame allocated to the pair of bytes.

In accordance with a feature of the present invention, digital data comprised of bytes represented in a video frame are decoded. The regions of the video frame are each sampled to determine the video component level represented by a subset allocated to the region, and a sequence of bits having a numerical value that corresponds to a numerical value assigned to the video component level are generated for each subset. The sequences of bits are combined to form decoded bytes.

As another feature of the present invention, the regions of the video frame are allocated to a pair of subsets, and each region is sampled to determine a first and a second video component level. Respective sequences of bits having numerical values that correspond to the numerical values of the first and second video component levels are generated for each pair of subsets and are combined to form decoded bytes.

As a further feature of the present invention, the regions of the video frame are allocated to a byte of digital data, and each region is sampled to determine the video component levels representing the byte. A sequence of bits having a numerical value that corresponds to the video component level is generated for each byte.

In accordance with an additional feature of the present invention, the regions of the video frame each represent a pair of bytes and are sampled to determine respective first and second video component levels, and sequences of bits respectively representing the pair of bytes are generated and have the numerical value corresponding to the video component level.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 3A–3B are diagrams showing an example of a portion of a monochrome video frame that is divided into regions associated with respective grey levels that represent data;

DETAILED DESCRIPTION OF THE PREFERRED EMBODIMENTS

The present invention encodes digital data, comprised of bytes formed of a predetermined number of data bits, for representation in a video frame and decodes digital data represented in the video frame. Each byte of digital data, or a portion of each byte, is represented in a respective region of the video frame by one or more video component levels that are assigned to the region and which correspond to the numerical value of the data bits of the byte or the portion.

Figure 1:
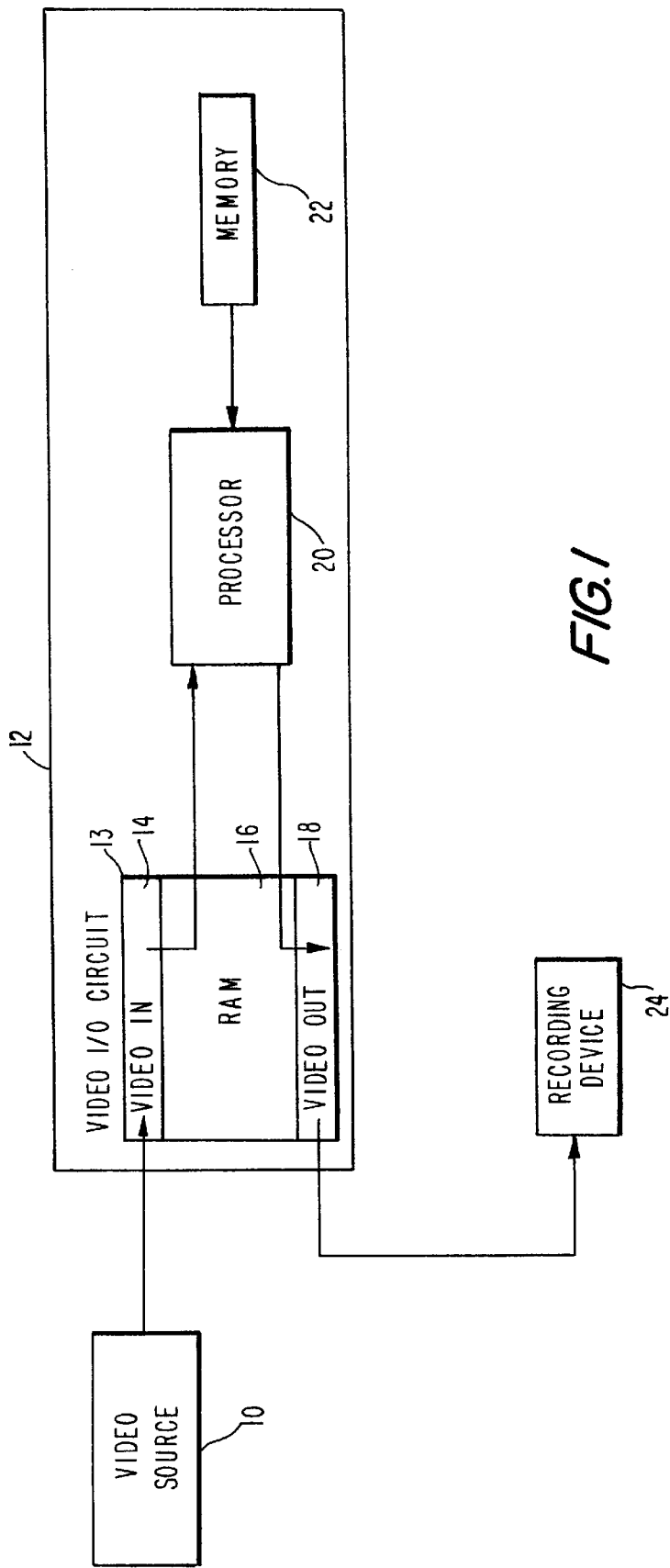
FIG. 1 is a block diagram showing an apparatus for carrying out the digital data encoding operation of the present invention.

FIG. 1 is a block diagram of an example of an apparatus for carrying out the encoding operation of the present invention. The encoder circuit 12 shown in FIG. 1 receives video image data from a video source 10, such as a video camera or a video tape recorder (VTR), via video input 14 of a video input/output (I/O) circuit 13, and the I/O circuit stores the frames of video picture data in RAM 16. The RAM is operable to deliver video image data to a processor circuit 20.

A memory circuit 22 stores digital data in a file or database and delivers a string of the digital data to the processor circuit 20. The processor circuit encodes the string of digital data into video component levels respectively assigned to regions of a video frame and delivers the video component levels and the pixel addresses of the regions to the RAM 16 of the video I/O circuit 13. The video I/O circuit generates an encoded video frame and supplies the encoded frame via video output 18 to a recording device 24.

The encoder circuit 12 is preferably a Personal Computer (PC) or similar device, and the processor circuit is preferably a microprocessor. The video I/O circuit 13 is preferably a video capture board suitable for a PC, such as a Visionetics International VIGA Genlock+ and or a Newtek Video Toaster 4000.

Figure 2A:
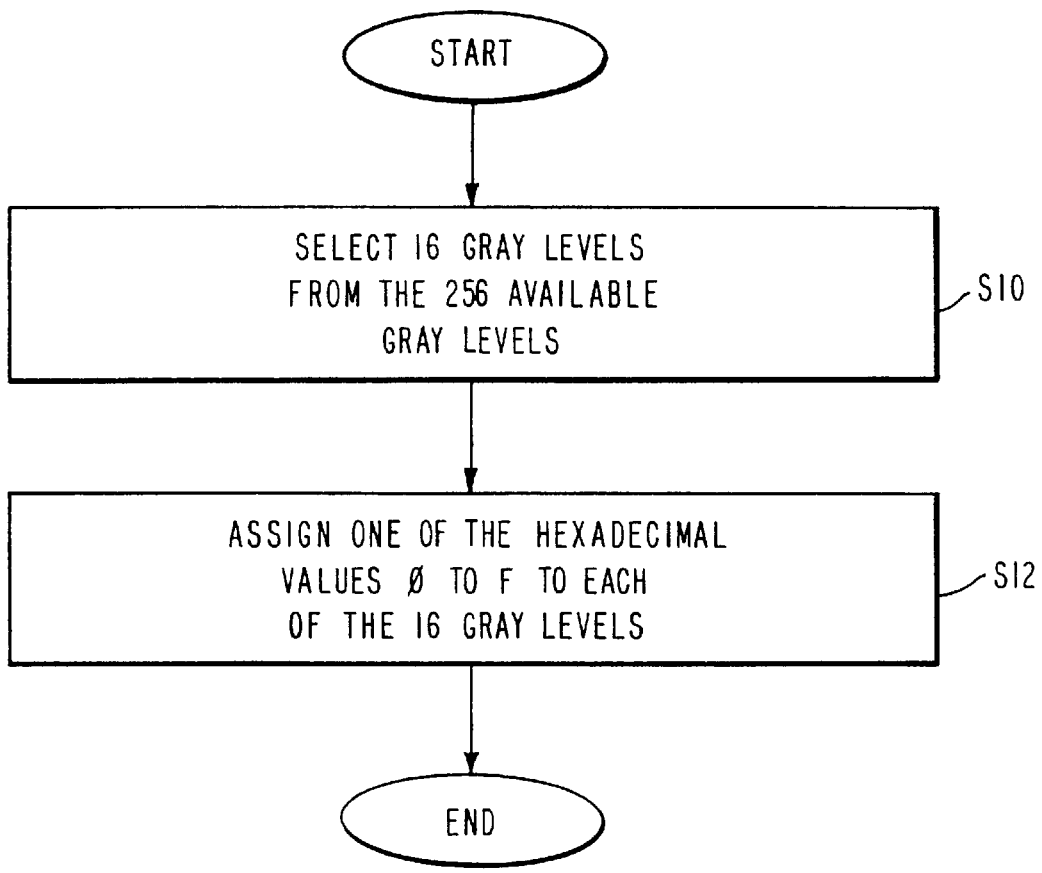
FIGS. 2A–2C are flow charts which represent the digital data encoding and decoding operation for representation in a monochrome analog video frame.
Figure 2B:
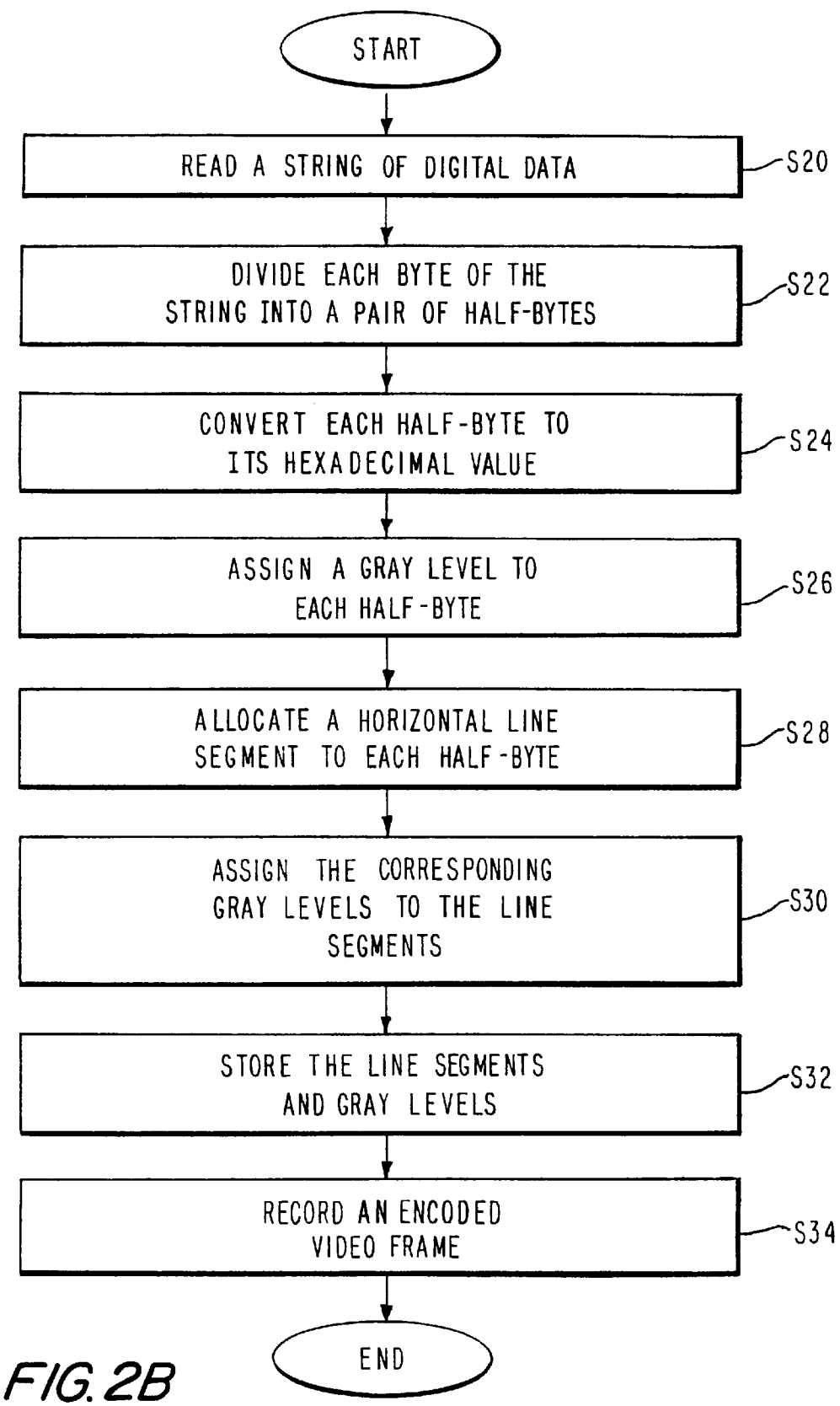

FIGS. 2A–2B illustrate an example of the encoding of digital data for representation in an analog monochrome video frame using, for example, the apparatus shown in FIG. 1. As shown in step S10 of FIG. 2A, the processor 20 selects sixteen gray levels, for example, from the 256 available levels of monochrome video gray scale. Preferably, the selected gray levels are sixteen levels apart from each other. A respective one of the hexadecimal values 0 to F is assigned, in step S12, to each of the sixteen gray levels.

FIG. 2B is a flow chart illustrating the encoding of a string of digital data. In step S20, the string of digital data is read from memory 22 and delivered to processor 20. The string of digital data is comprised of, for example, a sequence of 8-bit bytes such as 8-bit ASCII character code bytes that each represent a respective character. The processor 20 divides each 8-bit byte into a pair of 4-bit half-bytes, in step S22, and converts each half-byte to a hexadecimal value that corresponds to the numerical value of the bits of the half-byte, in step S24. A gray level having an assigned hexadecimal value equivalent to the numerical value of a respective half-byte is designated for the half-byte in step S26.

In step S28, the processor 20 divides at least a portion of a video frame into plural regions and assigns a respective region to each half-byte by allocating the pixel addresses of that region to the half-byte. If digital data and video image data are represented in the same video frame, the processor only divides the portion of the video frame in which video image information is not normally stored, namely the uppermost and lowermost lines of the video frame. If only digital data is to be stored, the processor divides up the entire video frame.

Preferably, the processor 20 divides the video frame into regions formed of respective segments of horizontal lines. The line segments are plural pixels in length so that subsequent decoding of the text data is not affected by horizontal jitter.

At step S30, the processor 20 assigns the gray level that was designated for a respective half-byte to each pixel of the line segment that was allocated to the half-byte and then delivers the pixel addresses and the assigned gray levels of each line segment of the video I/O circuit 13. The video I/O circuit stores each pixel address and its assigned gray levels in a respective storage location in the RAM. If only digital data is represented in the video frame, the video I/O circuit generates an encoded video frame comprised solely of regions of gray levels. Alternatively, if text data and video image data are represented in the frame, the video I/O circuit generates an encoded video frame in which the digital data is represented in the portion of the video frame in which useful video image data is not present, such as the uppermost 43 lines and the lowermost 2 lines of a 525 line NTSC video frame.

Alternatively, the processor 20 selects m gray levels from the 256 available gray levels and assigns a respective one of m numerical values to each of the m gray levels. The processor divides each byte into subsets of n data bits, where m =$2^n$. A gray level having an assigned numerical value equivalent to the numerical value of the subset is designated for the subset and assigned to a line segment that was designated for the subset. As an example, eight gray levels are selected and a respective one of the octal values 0 to 7 is assigned to each of the selected gray levels, and the bytes are divided into 3 bit subsets.

Figure 3A:
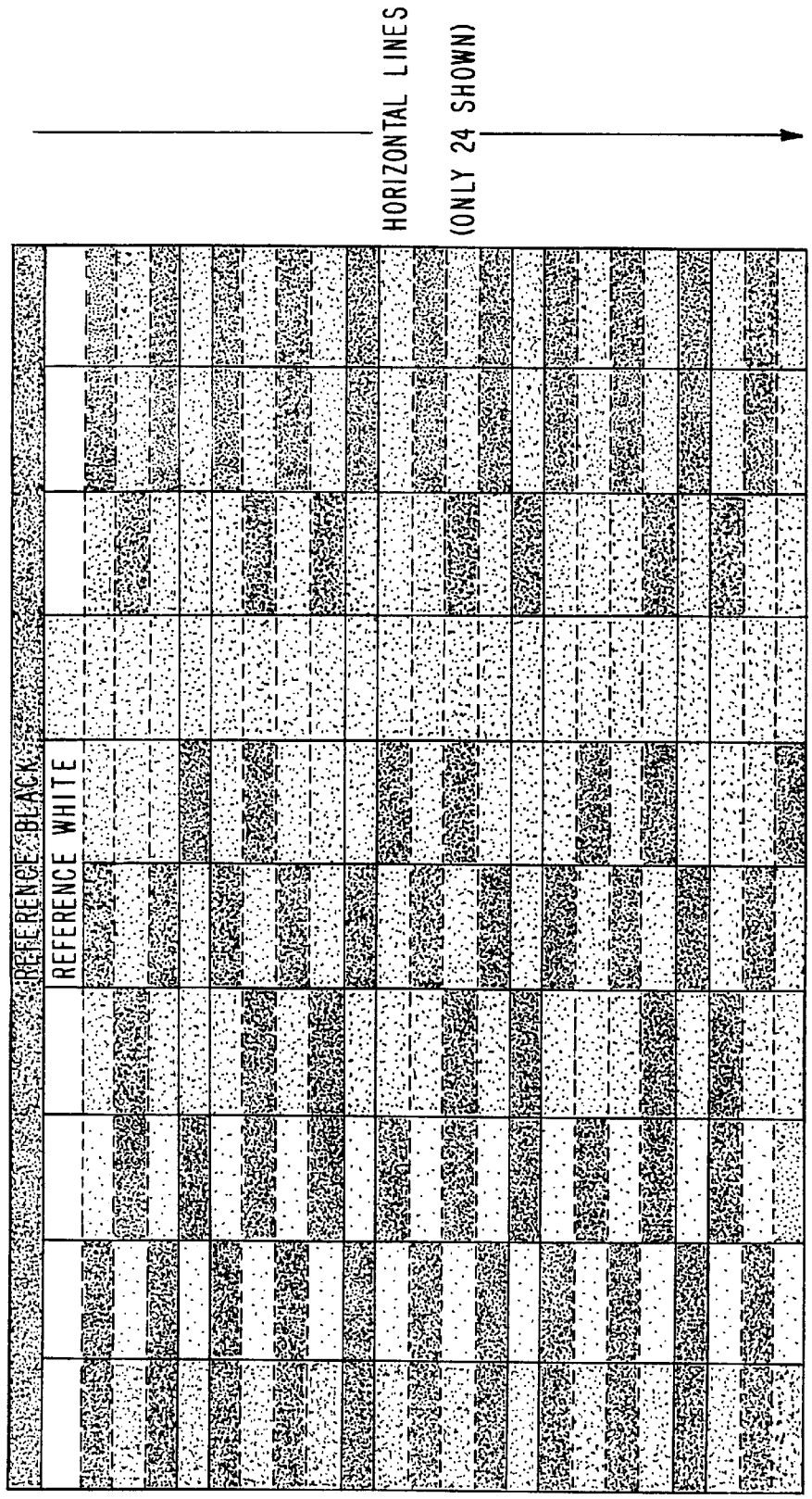

FIG. 3A depicts an example of the gray levels assigned to twenty-four of the line segments of a video frame. In this example, the line segments of the two uppermost lines represent a black "gray level" and a white "gray level", respectively, and serve as reference levels for subsequent decoding of the video frame. The lines below the reference lines are comprised of line segments that represent the digital data. As an example, the phrase "Bar-Code" is represented in the first two of these lines as line segments having gray levels that each represent a half-byte of an 8-bit ASCII character code byte. The letter "B" is represented by the first and second line segments of the first line, the letter "a" is represented by the third and fourth line segments, the letter "r" is represented by the fifth and sixth line segments, the character "-" is represented by the seventh and eighth line segments and the letter "C" is represented by the ninth and tenth line segments. Similarly, the letter "o" is represented by the first two line segments of the next line.

FIG. 3A also depicts how an encoded video frame is represented on a video monitor when the video frame is reproduced and displayed without decoding. Each line segment appears as a gray bar whose shade corresponds to the gray level that was designated for the line segment.

FIG. 3B illustrates the gray levels and the corresponding hexadecimal and ASCII values of the first horizontal line that is below the reference lines shown in FIG. 3A. As noted above, the horizontal line is divided into ten line segments. In the above example (in which the first two of the lines represent the phrase "Bar-Code"), the letter "B", which corresponds to an 8-bit ASCII code having the hexadecimal value 42, is represented in the first line segment by the gray level that is designated with the hexadecimal value 4 and is represented in the second line segment by the gray level that is designated with the hexadecimal value 2. Similarly, the letter "a", which corresponds to the 8-bit ASCII code having the hexadecimal value 61, is represented in the third line segment by the gray level that is designated with the hexadecimal value 6 and in the fourth line segment by the gray level that is designated with the hexadecimal value 1.

The line segments shown in FIG. 3A, for example, can be used to represent hexadecimal values that represent any kind of digital data and are not limited to representing the text data described above. For example, the line segments may represent hexadecimal values that comprise a compiled computer program.

In step S34 (FIG. 2B), the video I/O circuit 13 delivers the encoded video frame to a recording device 24, such as a VTR, for recording in a recording medium.

If the digital data are represented in an NTSC video frame, for example, each 640 pixel horizontal line of the NTSC video frame may be divided into ten line segments of 64 pixels each. If all the lines of the NTSC video frame are to represent digital data, the video frame stores up to 4,780 hexadecimal values to represent up to 2,390 8-bit bytes of digital data such as ASCII characters. Alternatively, if each horizontal line of the NTSC video frame is divided into 64 line segments of ten pixels each, the video frame is capable of storing up to 30,592 hexadecimal values which represent up to 15,296 bytes of digital data. It should be noted, however, that the digital data encoded in the above-described manner is also suitable for representation in a PAL or other type of analog video frame.

Figure 4:
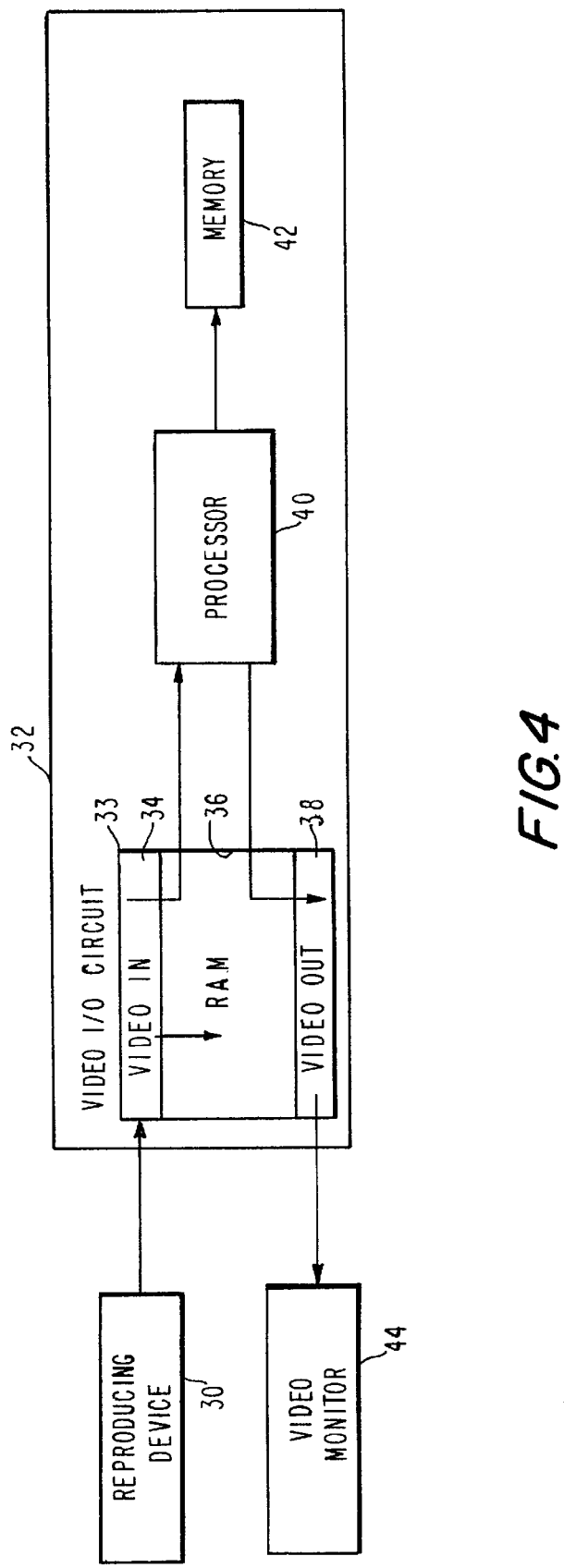
FIG. 4 is a block diagram showing an apparatus for carrying out the digital data decoding operation of the present invention.

FIG. 4 is a block diagram showing an example of an apparatus for carrying out the decoding operation of the present invention. A reproducing device 30, such as a VTR or a laser recorder/player, reproduces video frames and delivers the video frames to a video I/O circuit 33 of a decoder circuit 32 via a video input 34. As in FIG. 1, the decoder circuit may be a personal computer and the video I/O circuit may be a video capture board. The video I/O circuit 33 stores the reproduced video frames in RAM 36.

The video I/O circuit 33 reads a video frame from the RAM 36, detects the video component levels of the respective regions of the video frame and delivers the detected video component levels and their corresponding pixel addresses to processor circuit 40 which decodes the video component levels into a string of digital data. The processor delivers the string of digital data to the video I/O circuit 33 for concurrent output of the digital data with the video image data via video output 38 to a video monitor 44. When the digital data are text data, for example, the text data may be displayed superimposed on the displayed video image data but is preferably displayed in a border region surrounding the displayed video image. Alternatively, the processor 40 supplies the string of digital data to a memory 42 to store the digital data such as, when the digital data is text data, for subsequent display on a separate monitor.

Figure 2C:
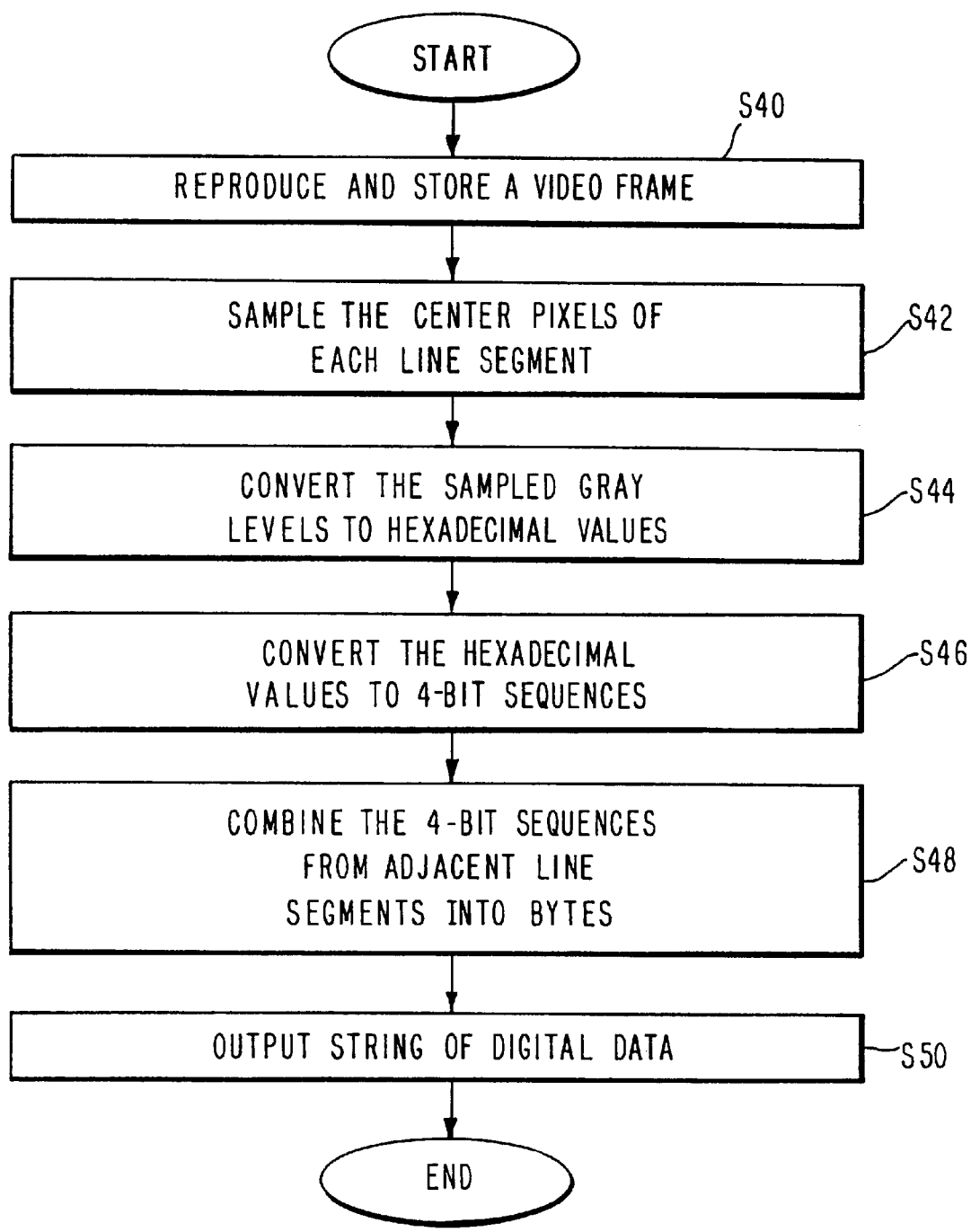

FIG. 2C is a flow chart illustrating the decoding of a string of digital data encoded in a video frame which uses, for example, the decoding circuit shown in FIG. 4. In step S40, a video frame reproduced by the reproducing device 30 is delivered to the video I/O circuit 33, as described above, which stores the address of each pixel and the gray level assigned to the pixel in a respective storage location in the RAM. The video I/O circuit 33, in step S42, divides the portion of the video frame in which digital data is represented into respective horizontal line segments of predetermined length and samples the centermost ten pixels, for example, of each line segment by reading the storage locations of the ten pixels to determine the gray levels stored therein. Only the centermost pixels of the segments are sampled to assure that each sample consists only of pixels from the same line segment, and thus errors resulting from misregistration of the video frame, such as are caused by horizontal jitter, are avoided. It is further preferable to sample at most ten pixels to reduce the time required to sample each video frame.

The video I/O circuit 33 delivers the pixel addresses of the centermost ten pixels and their corresponding gray levels to the processor 40 which, in step S44, represents each gray level with its nearest corresponding hexadecimal value. In step S46, the processor generates, for each hexadecimal value, a 4-bit sequence whose numerical value is the respective hexadecimal value and, in step S48, combines the 4-bit sequences that are generated from respective pairs of adjacent line segments into 8-bit bytes, such as 8-bit bytes of ASCII character codes. In step S50, the processor outputs a string of digital data formed of the 8-bit bytes.

Figure 5:
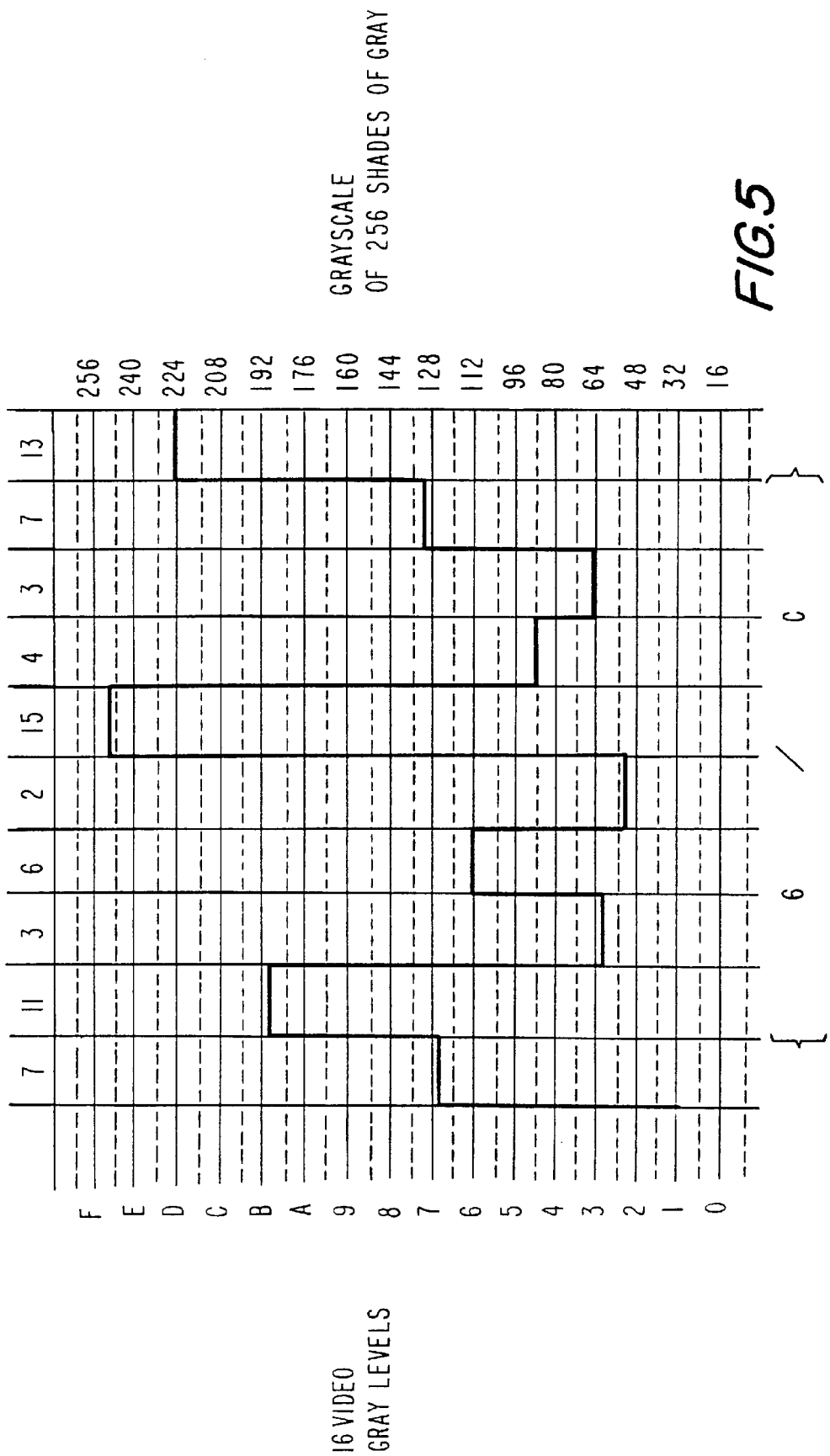
FIG. 5 is a diagram showing an example of a horizontal line of a monochrome video frame divided into regions associated with respective grey levels and showing the data represented by the grey levels.

FIG. 5 illustrates an example of the line segments of a horizontal line from which digital data are decoded. As shown in FIG. 5, each line segment is associated with a gray level shown on the rightmost scale of the figure. The gray level is detected by the video I/O circuit 33 and converted to its corresponding hexadecimal value, as represented on the left-most scale, by the processor 40 which, when the line segments represent text data, generates the string of ASCII characters shown. As discussed above, however, the line segments may represent any kind of digital data and are not limited to representing text data.

Alternatively, the video frame is reproduced by the reproducing device 30 without decoding and delivered to a video monitor (not shown) which displays the reproduced video image that is comprised of gray bars. The gray bars may be scanned by a bar-code reader (not shown) to deliver signals representing the gray levels to the processor 40 in the order scanned for subsequent decoding as shown in steps S44 to S50 of FIG. 2C.

Figure 6A:
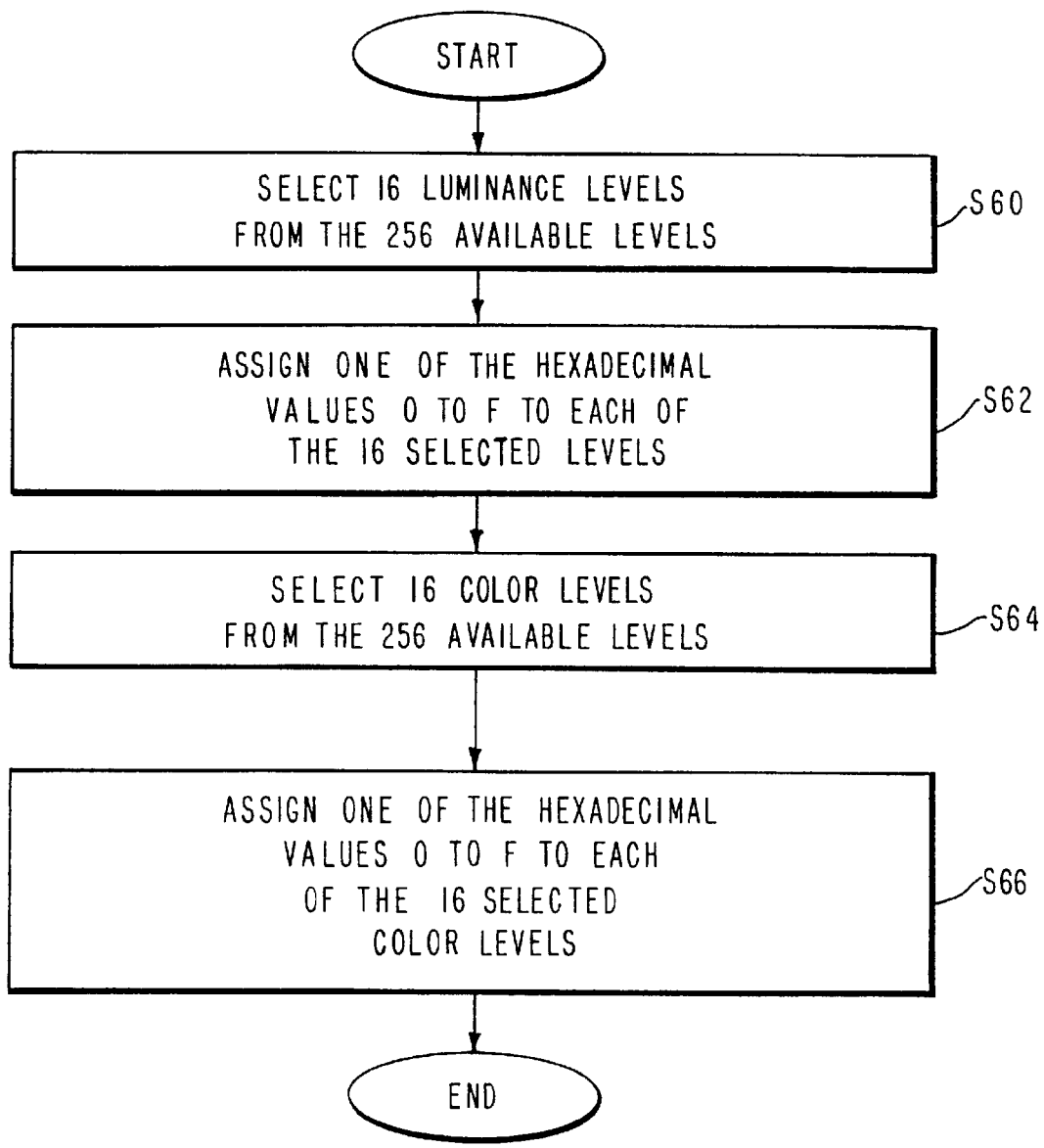
FIGS. 6A–6C are flow charts which represent the digital data encoding and decoding operation for representation in a color analog video frame.
Figure 6B:
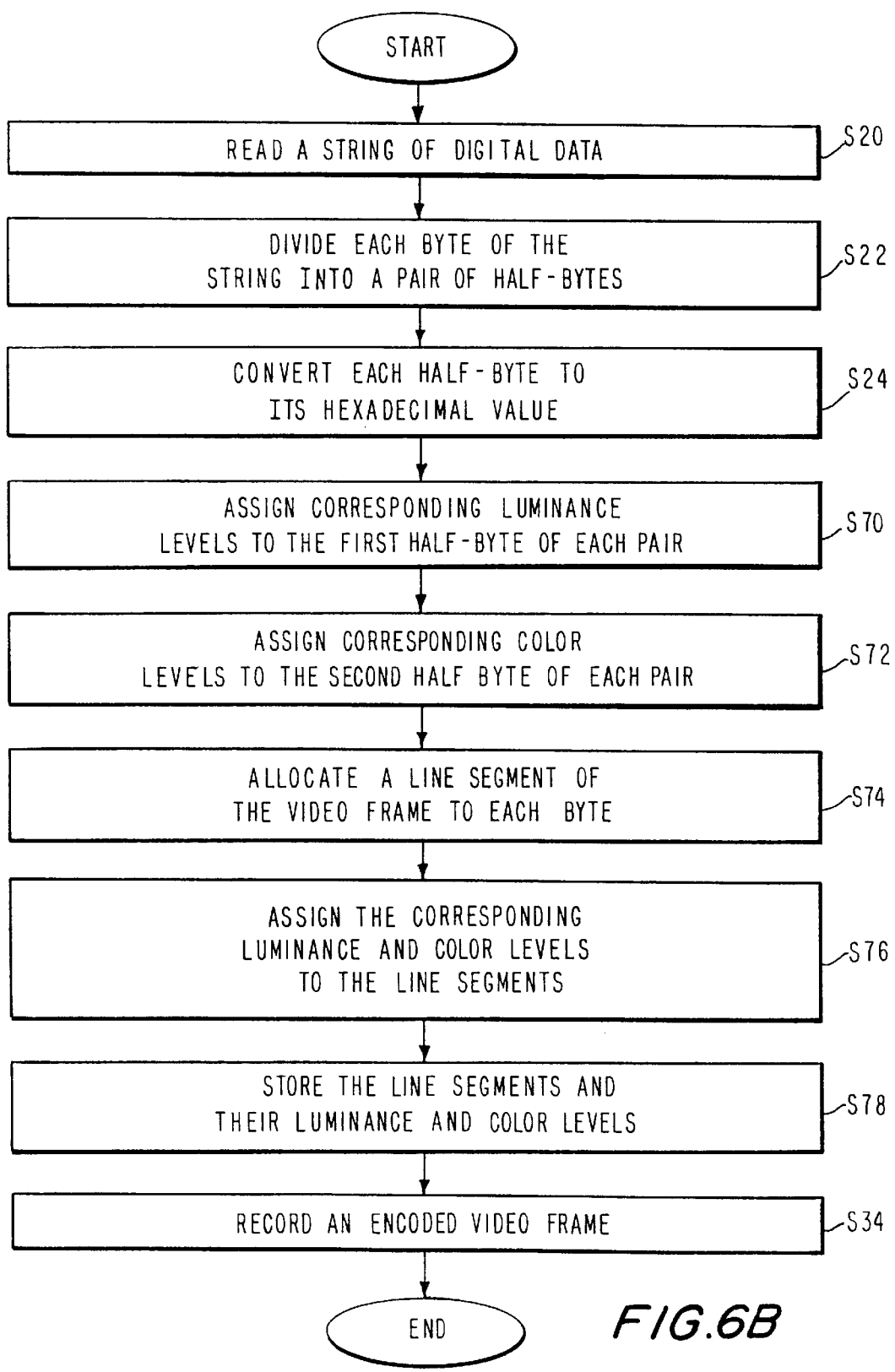

FIGS. 6A–6B illustrate a further example of the present invention in which digital data are encoded for representation in an analog color video frame which employs, for example, the apparatus shown in FIG. 1. As shown in step S60 of FIG. 6A, the processor 20 selects sixteen luminance levels, for example, from the 256 available luminance levels and assigns a respective one of the hexadecimal values 0 to F to each of the sixteen luminance levels in step S62. The processor, in step S64, also selects sixteen color levels, for example, from the 256 available color levels, and a respective one of the hexadecimal values 0 to F is assigned, in step S66, to each of the sixteen selected color levels.

A flow chart illustrating the encoding of a string of digital data is shown in FIG. 6B. Here, the processor 20 divides the 8-bit bytes of a string of digital data, such as a string of ASCII character codes, into a pair of 4-bit half-bytes and converts each half-byte to the hexadecimal value determined by the numerical value of the bits, as described above with reference to FIG. 2B. The processor, in step S70, then designates a luminance level having the same hexadecimal value as that of the bits of the first half-byte for the first half-byte and, in step S72, designates a color level having the same hexadecimal value as that of the bits of the second half-byte for the second half-byte.

In step S74, the processor 20 assigns respective regions of a portion of the video frame to each byte and, in step S76, assigns the luminance level designated for the first half-byte and the color level designated for the second half-byte to the line segment that was allocated for the byte. In step S78, the processor 20 supplies the pixel addresses of the line segments and their assigned luminance and color levels, which are assigned to each pixel address of the line segment, to their respective storage locations in the RAM 16 for subsequent recording as described above.

Alternatively, the processor 20 selects m luminance levels from the 256 available luminance levels and selects m color levels from the 256 available color levels and assigns a respective one of m numerical values to each of the luminance levels and to each of the color levels. The processor divides each byte into subsets of n data bits, where m=2$^n$, and a luminance level or a color level is designated for each subset and assigned to the line segment that is allocated to the subset.

Figure 7:
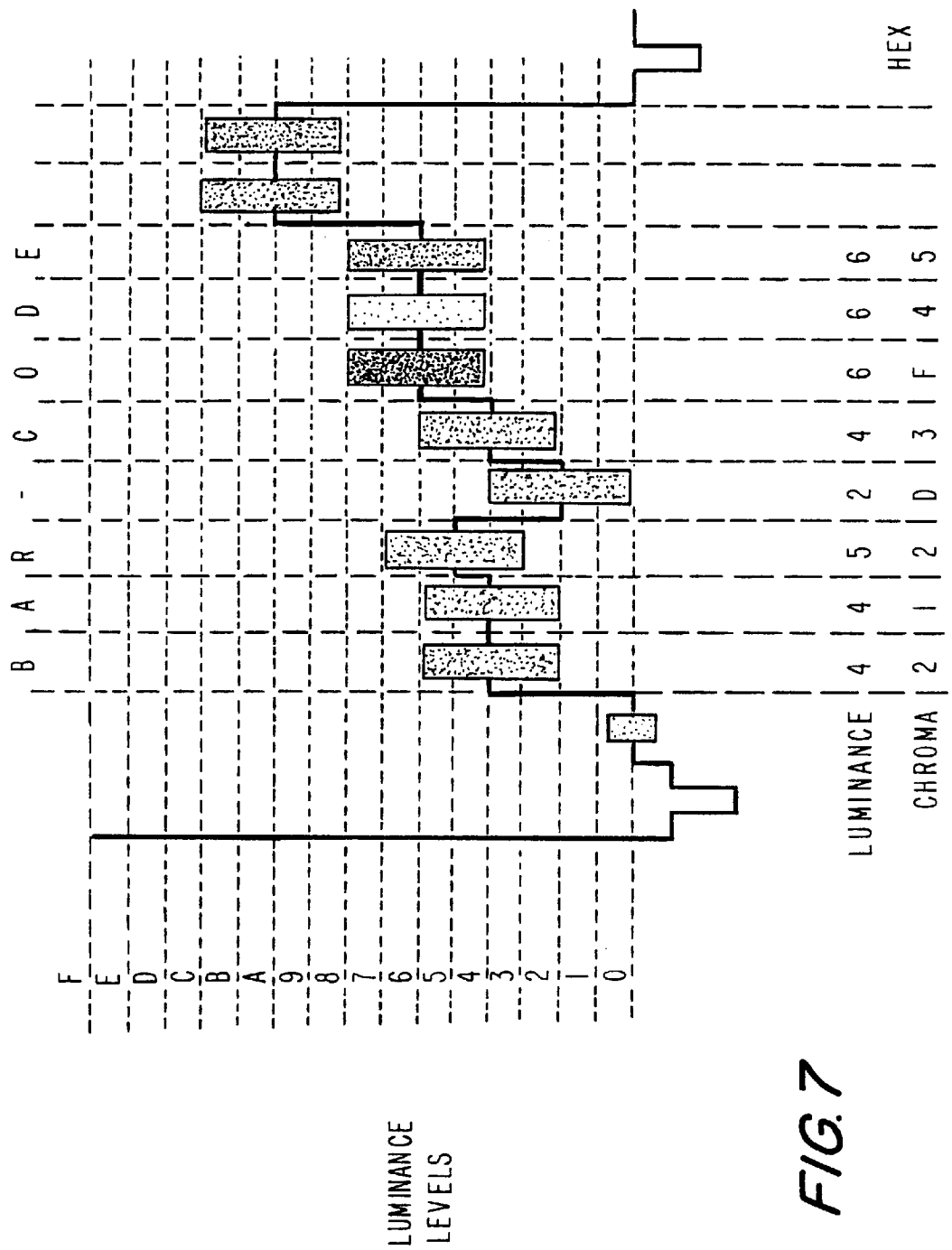
FIG. 7 is a diagram showing a horizontal line of a color video frame divided into regions having respective luminance and color levels that represent data.

FIG. 7 illustrates an example of the luminance levels and color levels assigned to the line segments of a horizontal line of a video frame. For example, the luminance and color levels of the line segments represent the phrase "BAR-Code". The letter B, which corresponds to the ASCII code having the decimal value 66 or the hexadecimal value 42, is represented in the first line segment by a luminance level designated with the hexadecimal value 4 and by a color level designated with the hexadecimal value 2. Similarly, the letter A, which corresponds to the ASCII code having the decimal value 65 or the hexadecimal value 41, is represented in the second line segment by the luminance and color levels designated with these values. It should be noted, however, that the line segments can be used to represent any kind of data and are not limited to representing text data.

In the above-described example of an NTSC video frame, each horizontal line is divided into ten line segments of 64 pixels each and thus each line is capable of storing up to ten bytes of digital data, such as ten ASCII characters, and an entire frame is capable of storing up to 4,780 bytes. As noted above, the first two lines are "reference black" and "reference white" lines. Alternatively, the horizontal lines are divided into 64 line segments of ten pixels each so that up to 30,592 bytes of digital data may be stored in a single NTSC video frame.

The above-described example of encoding text data in a color analog video frame is also suitable for encoding text data for representation in other analog video frame formats, such as the PAL format.

Figure 6C:
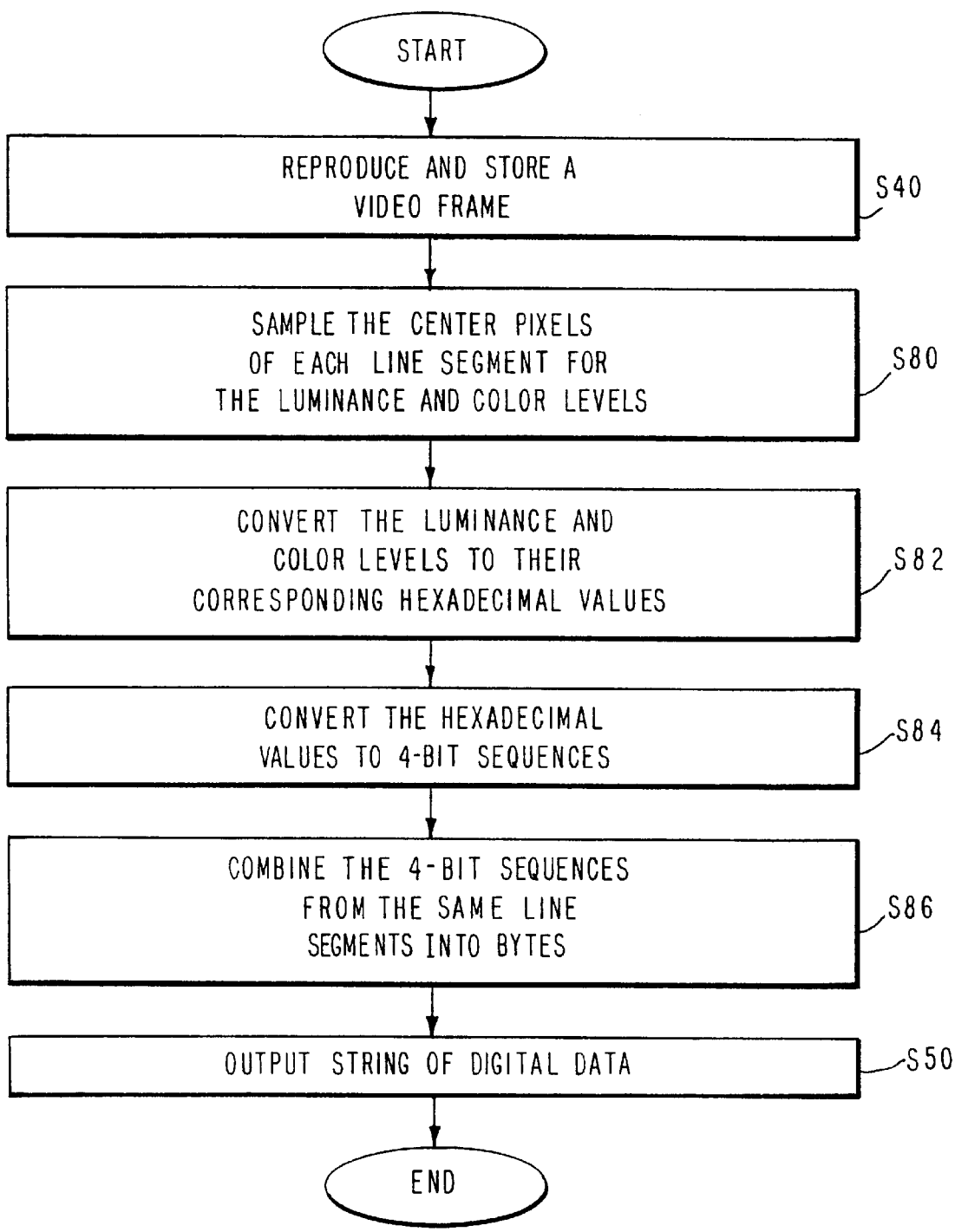

FIG. 6C is a flowchart illustrating the decoding of a string of text data represented in a color analog video frame which employs, for example, the decoding circuit shown in FIG. 4. As discussed above, a reproduced video frame is delivered to the video I/O circuit 33 which, in step S80, then divides the portion of the video frame in which digital data is represented into respective horizontal line segments of predetermined length and samples the centermost ten pixels, for example, of each line segment by reading the storage locations of the centermost pixels to determine the luminance and color levels stored therein.

The video I/O circuit 33 delivers the pixel addresses of each line segment and the associated luminance and color levels to the processor 40 which, in step S82, converts the luminance and color levels to the nearest corresponding hexadecimal values. In step S84, the processor generates, for each hexadecimal value, a 4-bit sequence having the same numerical value, and in step S86, combines the two 4-bit sequences derived from the luminance and color values associated with the same line segment to form an 8-bit byte of ASCII character code. The ASCII character codes are delivered for subsequent display or storage.

It should be noted that when the encoded video frame is displayed without decoding, the line segments located in the portion of the video frame in which image data is usually stored will appear as color bars of various intensities.

Figure 8A:
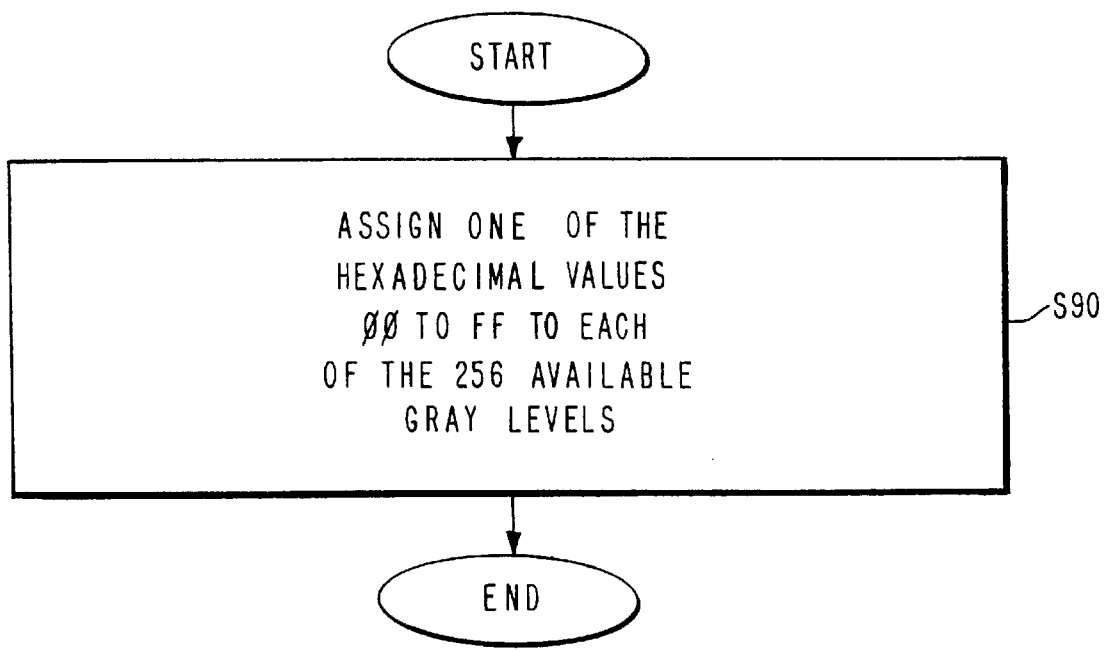
FIGS. 8A–8C are flow charts which represent the digital data encoding and decoding operation for representation in a monochrome D2 video frame.
Figure 8B:
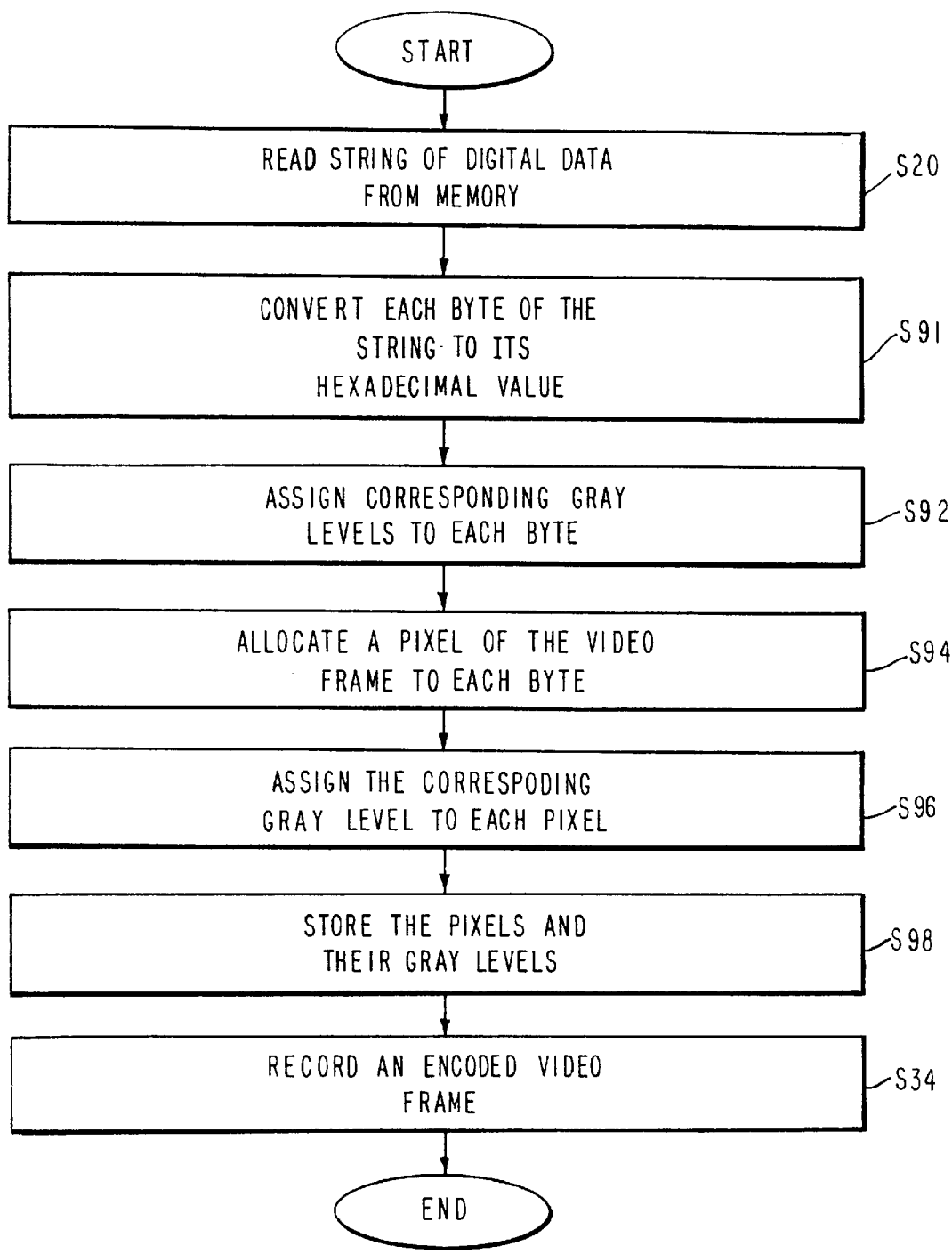

FIGS. 8A–8B illustrate another example of the present invention in which digital data are encoded for representation in a monochrome D2 video frame using, for example, the encoding apparatus shown in FIG. 1. In this example, the video I/O circuit 13 is, preferably, a D2 video I/O board but may alternatively be an RS343 video I/O board.

As FIG. 8A shows in step S90, the processor 20 assigns a respective one of the hexadecimal values 00 to FF to each of the 256 available gray levels. All 256 gray levels are suitable for representing numerical hexadecimal values because when the video frame is subsequently decoded, the respective D2 gray levels are more accurately distinguished than the gray levels of an analog video frame.

FIG. 8B is a flowchart illustrating the encoding of a string of digital data. Here, the string of digital data is delivered to the processor 20 which converts each 8-bit byte of the string into a hexadecimal value 00 to FF, in step S91, and in step S92, designates the gray level having the same hexadecimal value as that of a respective byte for the byte.

In step S94, the processor 20 assigns a respective pixel of a portion of the video frame to each ASCII character byte by allocating the pixel address. Only one pixel need be allocated to each byte because the D2 video frame is not subject to horizontal jitter. In step S96, the processor assigns the gray level that was designated for a respective byte to the pixel allocated to the byte and, in step S98, delivers the pixel address and its assigned gray level to the RAM 16 of the video I/O circuit 13 for subsequent recording in a recording medium.

In this example, up to 368,640 bytes of digital data, such as ASCII characters, may be represented in a 768×480 pixel D2 video frame.

Figure 8C:
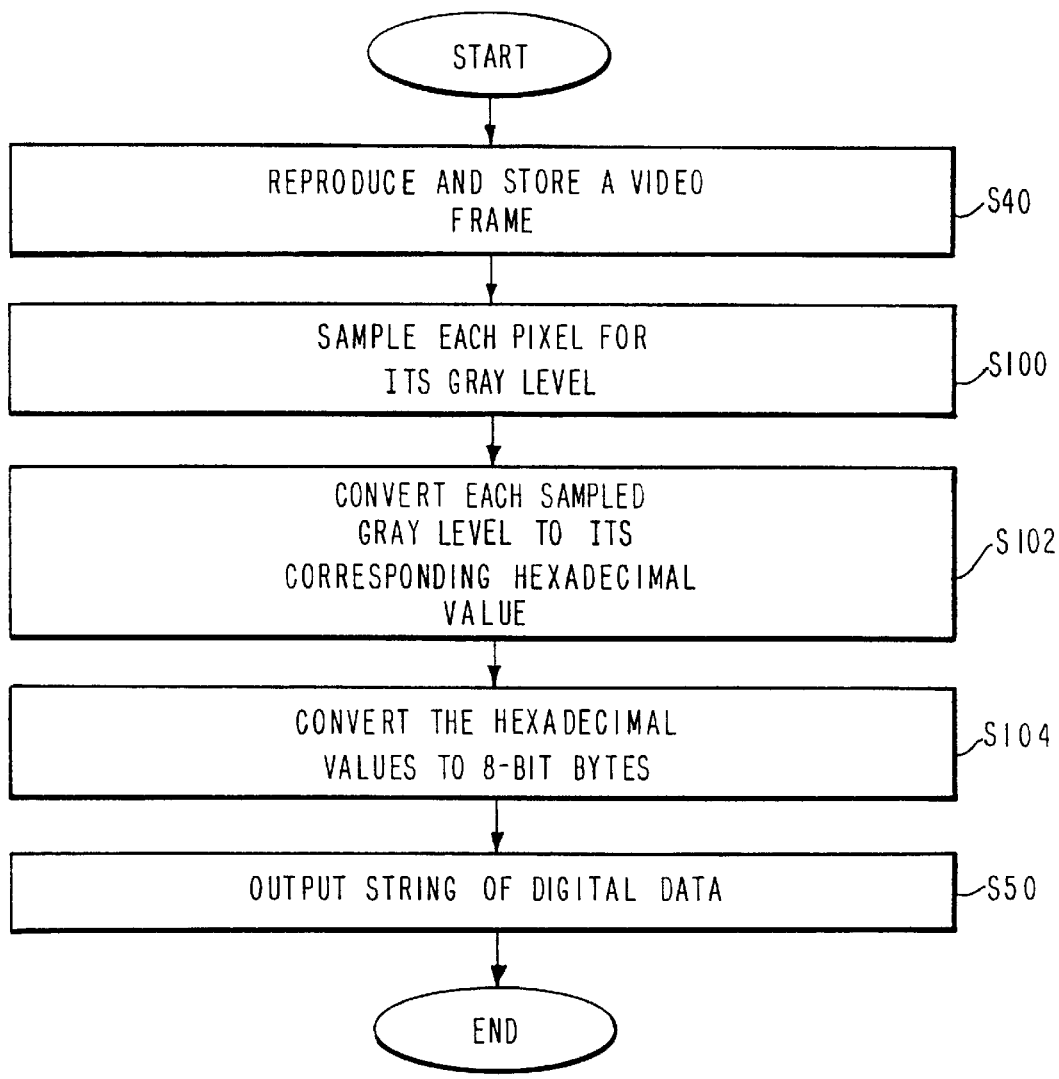

FIG. 8C is a flowchart showing an example of the decoding of digital data represented in a monochrome D2 video frame using, for example, the decoding apparatus shown in FIG. 4. Here, in the manner described above, a reproduced video frame is delivered to the video I/O circuit 33, and, in step S100, the video I/O circuit samples each pixel to determine the gray level represented by the pixel and delivers the gray level and its pixel address to the processor 40. The processor converts each of the gray levels to its respective hexadecimal value in step S102 and generates, for each hexadecimal value, a corresponding byte of digital data, such as an ASCII character code byte, for subsequent output and display or for storage in memory in step S104.

Figure 9A:
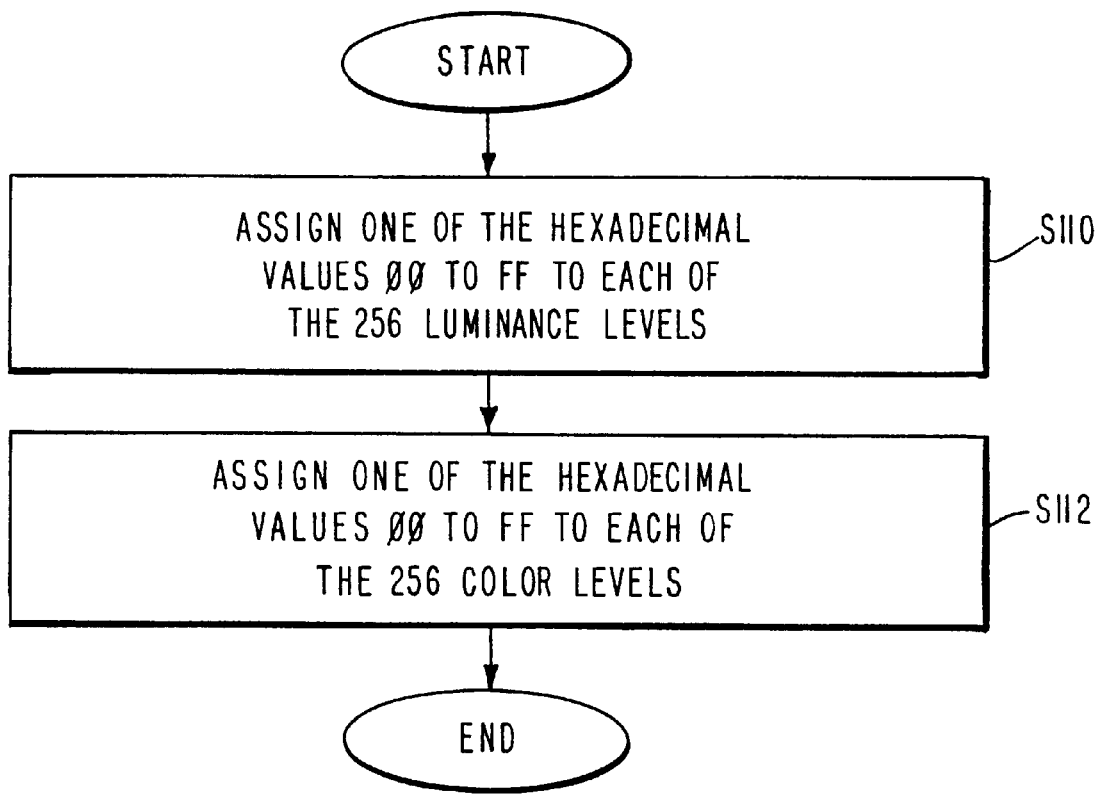
FIGS. 9A–9C are flow charts which represent the digital data encoding and decoding operation for representation in a color D2 video frame.
Figure 9B:
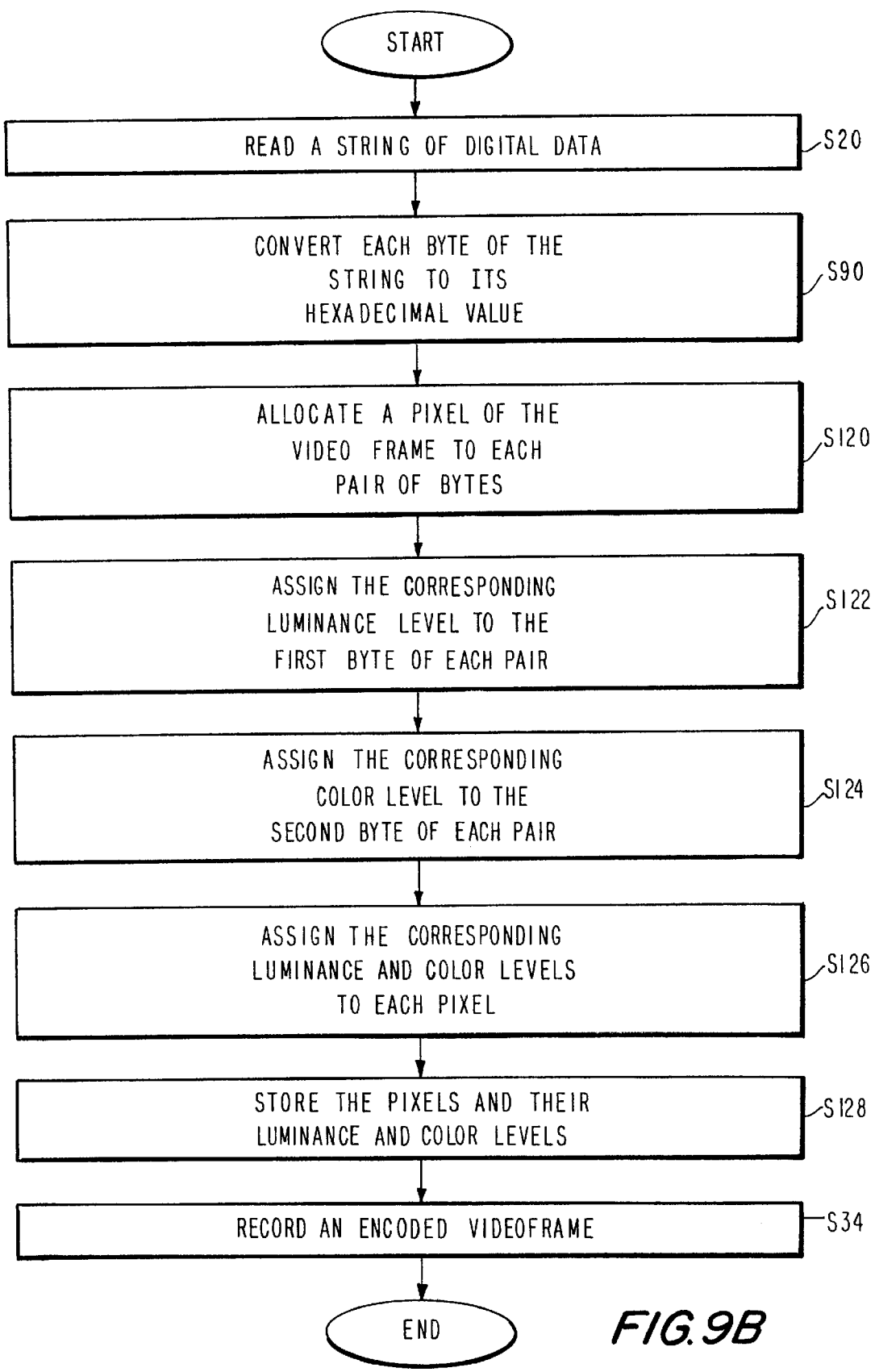

An example of the present invention in which digital data is encoded for representation in a color D2 video frame is shown in FIGS. 9A–9B. In this example, the encoding operation may be performed by the circuit shown in FIG. 1. As shown in FIG. 9A, a respective one of the hexadecimal values 00 to FF is assigned to each of the 256 luminance levels, in step S110, and is also assigned to each of the 256 color levels, in step S112.

A flowchart illustrating the encoding of a string of digital data is shown in FIG. 9B. As described above, the string of digital data is delivered to the processor 20 which converts each 8-bit byte into a hexadecimal value. In step S120, the processor allocates a pair of bytes to each pixel of the video frame. The luminance level having the same hexadecimal value as that of the first byte of the pair is designated for the first byte in step S122, and the color level having the same hexadecimal value as that of the second byte of the pair is designated for the second byte in step S124. In step S126, the processor assigns the luminance and color levels that were designated for a respective pair of bytes to the pixel allocated to the pair of bytes and, in step S128, delivers the pixel address and its luminance and color levels to the RAM 16 for subsequent recording as described above.

Figure 9C:
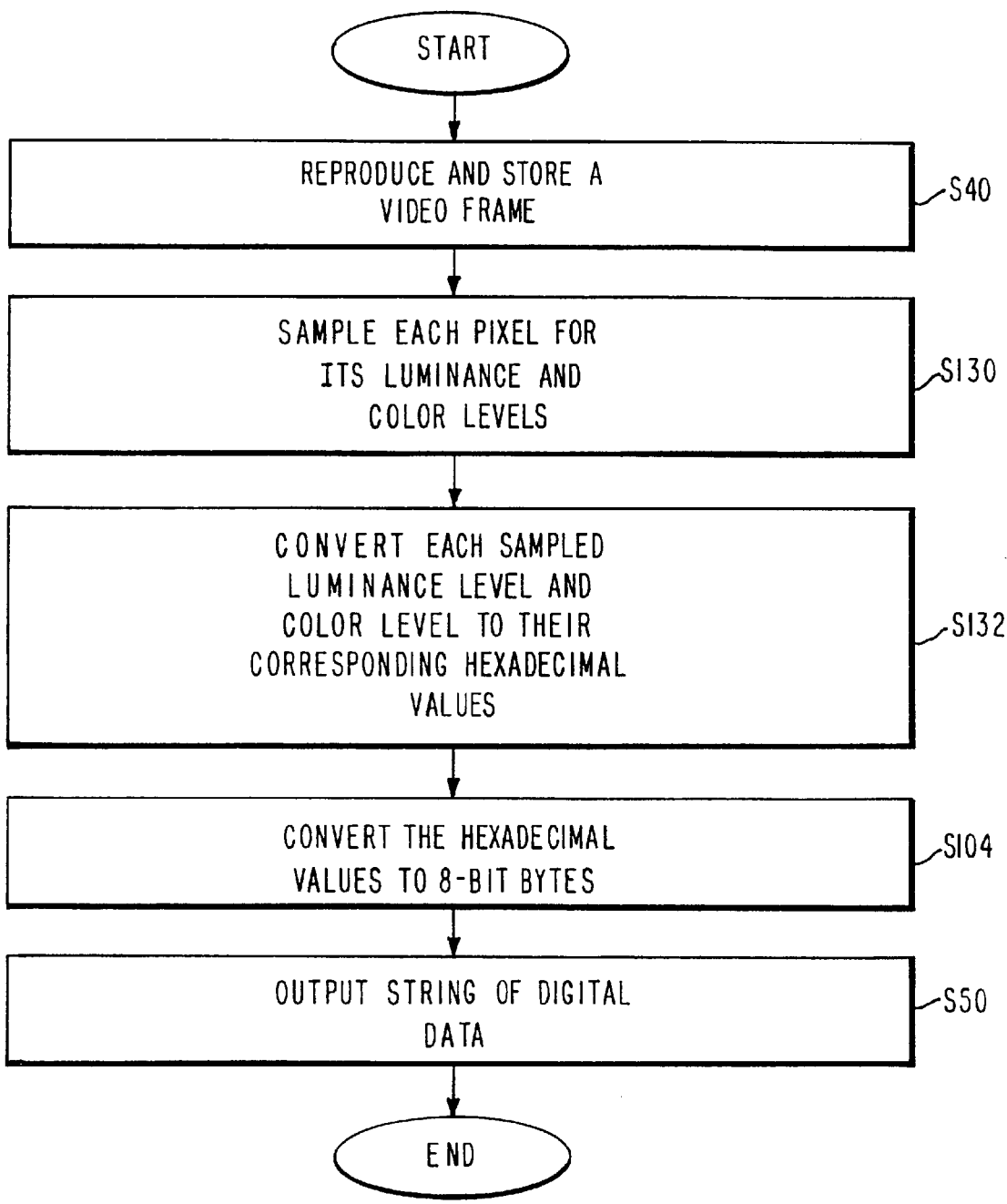

A flowchart showing the decoding of a string of digital data represented in a color D2 video frame is shown in FIG. 9C. As discussed above, a reproduced video frame is delivered to the video I/O circuit 33 which, in step S130, samples the pixels of the video frame to determine the luminance level and color level associated with each pixel and delivers the sampled luminance and color levels with their pixel addresses to the processor 40. In step S132, the processor converts each sampled luminance and color level into respective hexadecimal values and generates the corresponding string of bytes of digital data, such as a string of ASCII character codes, as described above.

Figure 10:
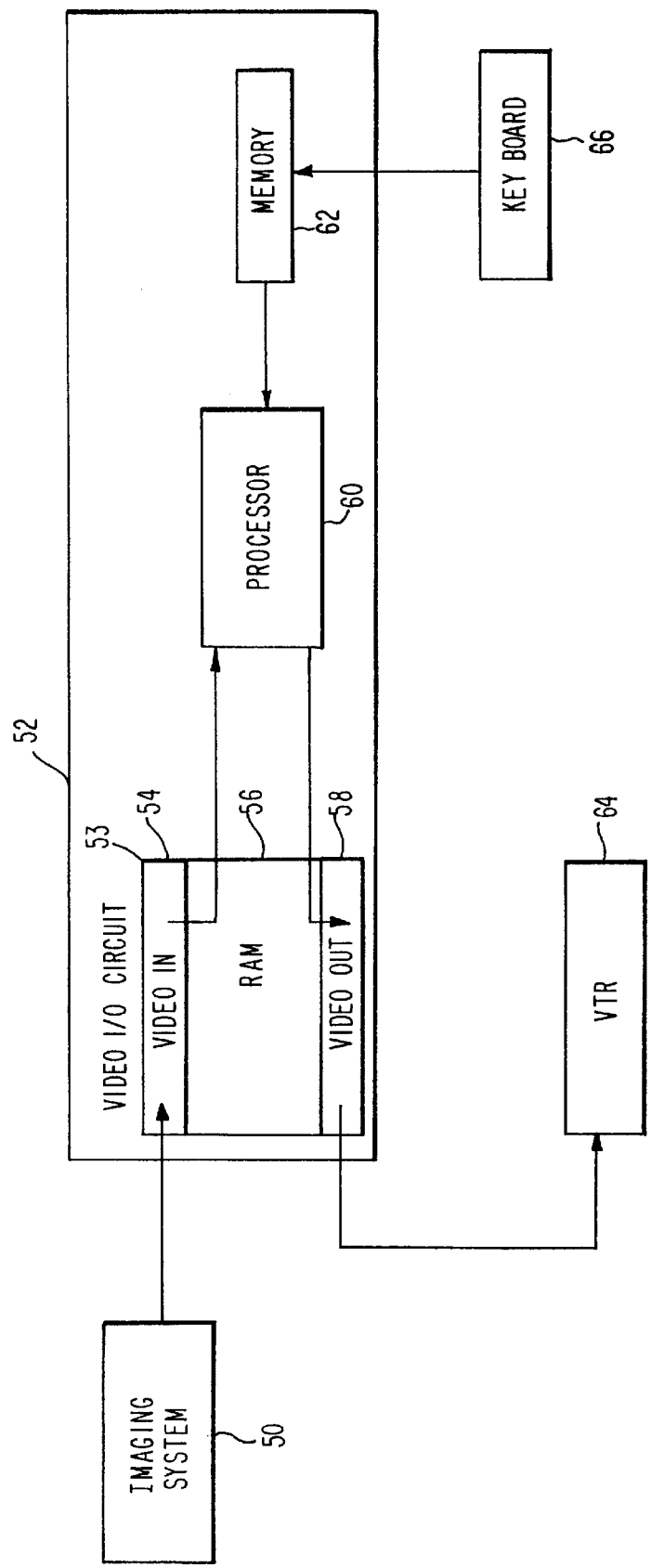
FIG. 10 is a block diagram showing an encoding apparatus operable in a patient diagnostic system according to the present invention.

FIG. 10 illustrates an example of the present invention that is applicable to a medical diagnostic system. Medical diagnostic images, such as angiography images, are generated by imaging system 50 for delivery to an encoder circuit 52. Patient information and other information are entered by an operator using keyboard 66 for delivery to and storage in memory 62. A processor 60 reads the patient data information from memory 62 and encodes the patient information for representation in, for example, an analog monochrome, analog color, D2 monochrome or D2 color video frame in the manner described above with reference to FIGS. 2A–2C, 6A–6C, 8A–8C and 9A–9C, respectively, and delivers the encoded information to RAM 56 of a video I/O circuit 53. The video I/O circuit generates encoded video frames and delivers the encoded video frames to a recording device 64, such as a VTR.

Prior to initiating the diagnostic procedure, patient information is entered for storage in the frames that precede the frames of the recorded medical diagnostic images. Because a greater amount of text data can be represented in the video frames, detailed background information that describes the patient's medical history may be included in addition to the name, date and time.

When these preceding video frames are subsequently decoded, the background information stored therein may be displayed on the same video monitor that displays the diagnostic images. Alternatively, the background information is stored and then displayed concurrent with the diagnostic images and may be superimposed on the diagnostic images or displayed in a separate region of a video screen, such as the border region surrounding the diagnostic images.

Furthermore, the background information and the diagnostic images may, alternatively, be concurrently displayed on separate monitors. The diagnostic images may be displayed without decoding, and a control signal may optionally be included with the encoded video frames to inhibit the display of the undecoded preceding frames.

Patient information may also be entered prior to or concurrent with the generation of the diagnostic images for representation in the same frames as the diagnostic images and stored in memory 62. Once the diagnostic images are delivered to the video I/O circuit 53, the processor 60 reads the stored patient information from memory 62, encodes the patient information for representation in the video frames and delivers the encoded patient information to the video I/O circuit 53 which represents the encoded patient information in the portion of the video frame in which the diagnostic images are not recorded. The video I/O circuit outputs the video frames for recording as described above. When the video frames are subsequently decoded, the patient information may be displayed on the same video monitor as the diagnostic images or on separate monitors, as described above. If the video frames are displayed on a separate monitor without decoding, however, the text data is not displayed.

After the recording of one or more diagnostic procedures, additional text data that is germane to all of the recorded diagnostic procedures may be after-recorded on the recording medium. As an example, table of contents frames in which the names of the patients tested may be recorded in the first frames of a video tape. The table of contents frames may be decoded and displayed in the manner discussed above.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of encoding digital data for representation in a video frame, the digital data being comprised of bytes having a predetermined number of data bits, said method comprising the steps of:

assigning a respective numerical value to each of a plurality of video component levels;

associating each of said bytes with the video component level corresponding to a numerical value determined by the data bits in the respective byte;

allocating respective regions of said video frame to each of said bytes;

assigning the video component level associated with each byte to the region allocated to that byte to generate an encoded video frame; and outputting the encoded video frame.

2. A method according to claim 1, wherein said video frame is a D2 video frame and said video component levels are grey levels.

3. A method according to claim 1, wherein said video frame is a D2 color video frame and said video component levels are luminance component levels.

4. A method according to claim 1, wherein said video frame is a D2 color video frame and said video component levels are color component levels.

5. A method according to claim 1, wherein each of said regions of said video frame is a pixel.

6. A method according to claim 1, wherein said step of allocating respective regions of said video frame allocates said regions within a portion of said video frame in which useful video image data is not present.

7. A method according to claim 1, wherein said step of outputting the encoded video frame includes recording the encoded video frame onto a recording medium.

8. A method of decoding digital data represented in a video frame, the digital data being comprised of bytes having a predetermined number of data bits, said method comprising the steps of:

inputting an encoded video frame comprised of a plurality of regions each allocated to a respective byte;

sampling each of said regions of the video frame to determine a respective video component level representing each of said bytes, the respective video component level corresponding to a numerical value;

generating, for each of said bytes, a respective sequence of bits having the corresponding numerical value to represent the byte; and outputting said bytes.

9. A method according to claim 8, wherein said step of inputting an encoded video frame includes reproducing the encoded video frame from a recording medium.

10. A method according to claim 8, wherein said video frame is a D2 video frame and said step of sampling each of said regions of the video frame determines a respective grey level.

11. A method according to claim 8, wherein said video frame is a D2 color video frame and said step of sampling each of said regions of the video frame determines a respective luminance component level.

12. A method according to claim 8, wherein said video frame is a D2 color video frame and said step of sampling each of said regions of the video frame determines a respective color component level.

13. A method according to claim 8, wherein said step of sampling each of said regions of the video frame samples only the regions within a portion of said video frame in which video image data is not ordinarily recorded.

14. A method according to claim 8, further comprising the step of displaying the digital data represented by the outputted bytes.

15. A method according to claim 8, wherein said encoded video frame further comprises video image data; and further comprising the steps of decoding the video image data and concurrently displaying the digital data represented by the outputted bytes with the decoded video image data.

16. A method of encoding digital data for representation in a video frame, the digital data being comprised of bytes having a predetermined number of data bits, said method comprising the steps of:

assigning a respective numerical value to each of a plurality of first video component levels;

assigning a respective numerical value to each of a plurality of second video component levels;

associating a first byte of respective pairs of bytes with the first video component level corresponding to a numerical value determined by the data bits in the first byte;

associating a second byte of each of said respective pairs with the second video component level corresponding to a numerical value determined by the data bits in the second byte;

allocating respective regions of said video frame to each of said pairs;

assigning the first and second video component levels associated with each pair to the region allocated to that pair to generate an encoded video frame; and outputting the encoded video frame.

17. A method according to claim 16, wherein said video frame is a D2 color video frame, said first video component levels are luminance component levels and said second video component levels are color component levels.

18. A method according to claim 16, wherein each of said regions of said video frame is a pixel.

19. A method according to claim 16, wherein said step of allocating respective regions of said video frame allocates said regions within a portion of said video frame in which useful video image data is not present.

20. A method according to claim 16, wherein said step of outputting the encoded video frame includes recording the encoded video frame onto a recording medium.

21. A method of decoding digital data represented in a video frame, the digital data being comprised of bytes having a predetermined number of data bits, said method comprising the steps of:

inputting an encoded video frame comprised of a plurality of regions each allocated to a respective pair of bytes;

sampling each of said regions of the video frame to determine a respective first video component level representing a first byte of each of said pairs;

sampling each of said regions of the video frame to determine a respective second video component level representing a second byte of each of said pairs, the respective first and second video component levels each corresponding to respective numerical values;

generating, for each of said first and said second bytes of said pairs, a respective sequence of bits having the corresponding numerical value to represent the byte; and outputting said bytes.

22. A method according to claim 21, wherein said step of inputting an encoded video frame includes reproducing the encoded video frame from a recording medium.

23. A method according to claim 21, wherein said video frame is a D2 color video frame; said step of sampling each of said regions of the video frame to determine a respective first video component level determines a respective luminance component level; and said step of sampling each of said regions of the video frame to determine a respective second video component level determines a respective color component level.

24. A method according to claim 21, wherein said step of sampling each of said regions of the video frame samples only the regions within a portion of said video frame in which useful video image data is not present.

25. A method according to claim 21, further comprising the step of displaying the digital data represented by the decoded bytes.

26. A method according to claim 21, wherein said encoded video frame further comprises video image data; and further comprising the steps of decoding the video image data and concurrently displaying the digital data represented by the decoded bytes with the decoded video image data.

27. An apparatus for encoding digital data for representation in a video frame, the digital data being comprised of bytes having a predetermined number of data bits, comprising:

means for assigning a respective numerical value to each of a plurality of video component levels;

means for associating each of said bytes with the video component level corresponding to a numerical value determined by the data bits in the respective byte;

means for allocating respective regions of said video frame to each of said bytes;

means for assigning the video component level associated with each byte to the region allocated to that byte to generate an encoded video frame; and means for outputting the encoded video frame.

28. An apparatus according to claim 27, wherein said video frame is a D2 video frame and said video component levels are grey levels.

29. An apparatus according to claim 27, wherein said video frame is a D2 color video frame and said video component levels are luminance component levels.

30. An apparatus according to claim 27, wherein said video frame is a D2 color video frame and said video component levels are color component levels.

31. An apparatus according to claim 27, wherein each of said regions of said video frame is a pixel.

32. An apparatus according to claim 27, wherein said means for allocating respective regions of said video frame allocates said regions within a portion of said video frame in which useful video image data is not present.

33. An apparatus according to claim 27, wherein said means for outputting the encoded video frame includes means for recording the encoded video frame onto a recording medium.

34. An apparatus for decoding digital data represented in a video frame, the digital data being comprised of bytes having a predetermined number of data bits, comprising:

means for inputting an encoded video frame comprised of a plurality of regions each allocated to a respective byte;

means for sampling each of said regions of the video frame to determine a respective video component level representing each of said bytes, the respective video component level corresponding to a numerical value;

means for generating, for each of said bytes, a respective sequence of bits having the corresponding numerical value to represent the byte; and means for outputting said bytes.

35. An apparatus according to claim 34, wherein said means for inputting an encoded video frame includes means for reproducing the encoded video frame from a recording medium.

36. An apparatus according to claim 34, wherein said video frame is a D2 video frame and said means for sampling each of said regions of the video frame determines a respective grey level.

37. An apparatus according to claim 34, wherein said video frame is a D2 color video frame and said means for sampling each of said regions of the video frame determines a respective luminance component level.

38. An apparatus according to claim 34, wherein said video frame is a D2 color video frame and said means for sampling each of said regions of the video frame determines a respective color component level.

39. An apparatus according to claim 34, wherein said means for sampling each of said regions of the video frame samples only the regions within a portion of said video frame in which video image data is not ordinarily recorded.

40. An apparatus according to claim 34, further comprising means for displaying the digital data represented by the outputted bytes.

41. An apparatus according to claim 34, wherein said encoded video frame further comprises video image data; and further comprising means for decoding the video image data and means for concurrently displaying the digital data represented by the outputted bytes with the decoded video image data.

42. An apparatus for encoding digital data for representation in a video frame, the digital data being comprised of bytes having a predetermined number of data bits, comprising:

means for assigning a respective numerical value to each of a plurality of first video component levels;

means for assigning a respective numerical value to each of a plurality of second video component levels;

means for associating a first byte of respective pairs of bytes with the first video component level corresponding to a numerical value determined by the data bits in the first byte;

means for associating a second byte of each of said respective pairs with the second video component level corresponding to a numerical value determined by the data bits in the second byte;

means for allocating respective regions of said video frame to each of said pairs;

means for assigning the first and second video component levels associated with each pair to the region allocated to that pair to generate an encoded video frame; and means for outputting the encoded video frame.

43. An apparatus according to claim 42, wherein said video frame is a D2 color video frame, said first video component levels are luminance component levels and said second video component levels are color component levels.

44. An apparatus according to claim 42, wherein each of said regions of said video frame is a pixel.

45. An apparatus according to claim 42, wherein said means for allocating respective regions of said video frame allocates said regions within a portion of said video frame in which useful video image data is not present.

46. An apparatus according to claim 42, wherein said means for outputting the encoded video frame includes means for recording the encoded video frame onto a recording medium.

47. An apparatus for decoding digital data represented in a video frame, the digital data being comprised of bytes having a predetermined number of data bits, comprising:

means for inputting an encoded video frame comprised of a plurality of regions each allocated to a respective pair of bytes;

first sampling means for sampling each of said regions of the video frame to determine a respective first video component level representing a first byte of each of said pairs;

second sampling means for sampling each of said regions of the video frame to determine a respective second video component level representing a second byte of each of said pairs, the respective first and second video component levels each corresponding to respective numerical values;

means for generating, for each of said first and said second bytes of said pairs, a respective sequence of bits having the corresponding numerical value to represent the byte; and means for outputting said bytes.

48. An apparatus according to claim 47, wherein said means for inputting an encoded video frame includes means for reproducing the encoded video frame from a recording medium.

49. An apparatus according to claim 47, wherein said video frame is a D2 color video frame; said first sampling means determines a respective luminance component level; and said second sampling means determines a respective color component level.

50. An apparatus according to claim 47, wherein said first and second sampling means sample only the regions within a portion of said video frame in which useful video image data is not present.

51. An apparatus according to claim 47, further comprising means for displaying the digital data represented by the decoded bytes.

52. An apparatus according to claim 47, wherein said encoded video frame further comprises video image data; and further comprising means for decoding the video image data and means for concurrently displaying the digital data represented by the decoded bytes with the decoded video image data.

* * * * *